United States Patent [19]

Maillot et al.

[11] Patent Number: 5,659,536
[45] Date of Patent: Aug. 19, 1997

[54] OPTICAL STORAGE METHOD AND DEVICE FOR STORING AND READING DIGITAL INFORMATION

[75] Inventors: Christian Maillot, Courbevoie; Jean-Pierre Huignard, Paris; Jean-Claude Lehureau, Sainte Genevieve des Bois; Paul-Louis Meunier, Paris; Claude Puech, Ballainvilliers, all of France

[73] Assignee: Thomson-CSF, Puteaux, France

[21] Appl. No.: 463,356

[22] Filed: Jun. 5, 1995

Related U.S. Application Data

[63] Continuation of Ser. No. 993,978, Dec. 17, 1992, abandoned, which is a continuation of Ser. No. 688,259, Apr. 22, 1991, abandoned.

[30] Foreign Application Priority Data

May 2, 1990 [FR] France .................................. 90 05538

[51] Int. Cl.$^6$ ....................................................... G11B 7/00
[52] U.S. Cl. ..................... 369/275.1; 369/109; 369/275.4; 369/103
[58] Field of Search .......................... 369/109, 110, 369/111, 275.1, 275.2, 275.3, 275.4, 112, 116, 103, 94, 108, 44.26, 59, 54, 106; 358/342; 356/106, 119; 359/21, 24, 22; 365/215, 216

[56] References Cited

U.S. PATENT DOCUMENTS

| | | | |
|---|---|---|---|
| 3,610,722 | 10/1971 | Bestenreiner | 369/108 X |
| 3,987,421 | 10/1976 | Puech | 340/173 |
| 4,094,011 | 6/1978 | Nagao | 365/216 |
| 4,125,860 | 11/1978 | Ishii et al. | 358/128 |
| 4,325,135 | 4/1982 | Dil et al. | 369/109 X |
| 4,547,875 | 10/1985 | Ohta et al. | 369/275.4 |
| 4,569,038 | 2/1986 | Nagashima et al. | 369/109 |
| 4,783,776 | 11/1988 | Ishigaki et al. | 369/121 |
| 4,868,787 | 9/1989 | Okada | 369/100 |
| 4,876,666 | 10/1989 | Imai et al. | 369/109 |
| 4,908,813 | 3/1990 | Ojima et al. | 369/109 |
| 4,956,812 | 9/1990 | Seya et al. | 369/106 |
| 4,988,153 | 1/1991 | Paek | 359/27 |
| 5,064,258 | 11/1991 | Inokuchi et al. | 369/103 |
| 5,107,482 | 4/1992 | Goto et al. | 369/100 |
| 5,138,592 | 8/1992 | Fujita | 369/44.13 |
| 5,138,604 | 8/1992 | Umeda et al. | 369/103 |
| 5,162,927 | 11/1992 | Moss et al. | 359/24 |
| 5,282,066 | 1/1994 | Yu et al. | 359/24 |

FOREIGN PATENT DOCUMENTS

| | | | |
|---|---|---|---|
| 0158639 | 6/1989 | Japan | 369/103 |
| 1138128 | 9/1967 | United Kingdom . | |

OTHER PUBLICATIONS

Applied Optics, vol. 14, No. 3, Mar. 1975, "Photopolymer Material for Holography", B.L. Booth, pp. 593–601.
Electronics, vol. 61, No. 18, Dec. 1988, New York, US, "Photorefractive memory gets new life", pp. 92–93.

Primary Examiner—Thang V. Tran
Attorney, Agent, or Firm—Oblon, Spivak, McClelland, Maier & Neustadt, P.C.

[57] ABSTRACT

Disclosed is a system for the recording of data on optic disks. Presently used optic disks, which can be read with lasers working in wavelengths of the visible region (between 0.5 and 0.8 microns), have a maximum surface storage density of the order of one data bit per elementary zone having an area of about one square micrometer. Beyond this limit, the diffraction does not allow the neighboring zones to be distinguished. A means is proposed to considerably increase the storage capacities: in an elementary zone of a layer, an information bit is written not in the form of a point of absorption of a laser light but in the form of a diffraction grating with a determined pitch. Several diffraction gratings, having pitches different from one another, may be superimposed at the same position, enabling the recording, in one and the same zone, of several information bits. The diffraction gratings are made by a periodic local variation of the optic index of the layer. They are made by a high energy laser beam, out of a material with an index that may vary as a function of this energy. The reading is done by a frequency tunable laser that enables the detection, for different frequencies, of the presence or absence of diffraction gratings.

18 Claims, 2 Drawing Sheets

OPTICAL STORAGE METHOD AND DEVICE FOR STORING AND READING DIGITAL INFORMATION

This application is a continuation of application Ser. No. 07/993,978, filed on Dec. 17, 1992, now abandoned; which is a continuation of application Ser. No. 07/688,259, filed Apr. 22, 1991, abandoned.

BACKGROUND OF THE INVENTION

The invention relates to a novel system for the recording of data by the storage of digital information in optic form.

In systems for the optic storage of digital information, the maximum possible storage density is limited by diffraction at the wavelength of the writing or reading operations. For the optic wavelengths commercially available in the form of laser diodes, this limit on density can be placed, for example, in the region of one bit per square micrometer. Beyond this limit, the laser light is diffracted by the molecular structure of the material in which the recording is etched, and it is no longer possible to distinguish adjacent elementary dots.

To increase the density of digital information that can be stored in a disk, i.e. to increase the quantity of information stored without increasing the surface area of the disk or to reduce the surface area of the disk without reducing the quantity of information, the use of a stacking of photosensitive layers reacting with different wavelengths (like superimposed photographic layers) has already been proposed: information elements are stored in each layer and each of them can be read only by the specific laser having a well-determined wavelength that is different from the wavelengths used to read the information stored in the other layers. The absorption peaks of the different layers should be at wavelengths that are clearly separated from one another to enable discrimination among the pieces of information. The upper layers have to be transparent to the wavelengths of sensitivity of the lower layers. The difficulty therefore lies in finding, for the different layers, those materials that have the requisite properties in terms of spectral selectivity, sensitivity (for the writing), transparency and information-retaining time.

SUMMARY OF THE INVENTION

The invention proposes an original approach by which the quantity of digital information available per unit of surface area is greatly increased. This approach makes use of a principle different from the one behind the superimposition of layers.

This approach uses a layer of transparent material, in the thickness of which diffraction optic gratings are formed. Several different diffraction gratings are mixed together in each elementary zone of the layer. The digital information is defined by the presence or absence, in a determined elementary zone, of a grating that diffracts at a determined wavelength, each grating being capable of selectively diffracting an electromagnetic radiation with a determined wavelength while hardly diffracting or not at all diffracting radiation at wavelengths highly diffracted by the other gratings. The wording "elementary zone" is intended to mean a zone of lateral dimensions which are just sufficient for storing a bit of digital information in the form of a diffracting grating having fringes parallels to the surface of the layer. It should be therefore understood that the invention proposes to store in that elementary zone, having dimensions adapted to store one bit of information, several bits; each bit is defined by the presence or absence in that zone of a diffraction grating at a respective wavelength. The gratings are intimately mixed together and are located in the thickness of the layer; the fringes are essentially parallel to the surface.

The layer is preferably a layer of transparent material with photo-induced variation in refraction index. Several bits of information are written in one and the same elementary zone of the layer: the writing takes the form of the presence or absence of diffraction gratings with different pitches, with each bit corresponding to a grating with a determined pitch that is different from the pitch of the other bits.

In standard optic recording systems, different information bits should be stored in different elementary geographical regions. The invention proposes an original system wherein several different bits may be recorded at the same location. The information corresponding to the different bits is represented by the pitches of the diffraction gratings superimposed on (mixed with) one another in one and the same elementary region.

Moreover, since the diffracting gratings are vertically recorded, i.e. with fringes parallel to the layer surface, lateral dimensions of each elementary zone are minimized, so that the storage density of digital information can be considerably increased.

It can be seen that, if several different gratings can be superimposed in one and the same zone, and if the pitch of each of the superimposed gratings present in this zone can be known, then the storage density is increased as compared with all the standard systems in which only one bit can be stored in an elementary region.

Now, a diffraction grating with a constant pitch very selectively diffracts only certain light wavelengths that go through it. It is therefore possible, by using beams of appropriate wavelengths, to detect the presence or absence of diffraction gratings with determined pitches, even if several gratings are superimposed at the same point, provided that the wavelengths diffracted by each grating are quite different from the wavelengths diffracted by the other gratings.

The recording medium used is therefore a layer of material with photo-induced variation in index, i.e. a material with a refraction index that will vary locally and permanently under the effect of a photon energy applied locally to the material. And the energy will be applied in such a way that permanent index modifications are recorded according to a diffraction grating pattern, in fringes or strata parallel to the surface of the layer, in the thickness of this layer.

A grating will be recorded preferably by using a laser focused on a small elementary region of this layer, perpendicularly to the layer thickness. The simplest approach lies in combining the laser beam with its own reflection in a mirror to produce interferences in the zone in which the beams get combined (the zone which, it will be seen to it, is placed in the thickness of the recording layer). The combining of the beams produces an interference grating with a geometric pitch that is directly related to the wavelength of the laser (the pitch is the wavelength divided by twice the refraction index of the material). The light energy available in the combined beams is chosen so as to be strong enough for the interference grating to prompt a local modification of the refraction index of the layer according to the distribution of light energy, i.e. according to the pattern of the interference grating. There is therefore a permanent recording, in the layer, of an optic grating with a well-determined pitch related to the wavelength of the laser, as in a hologram, but in the thickness of the layer.

If the operation is repeated with a laser having a different wavelength, another interference grating with a different pitch can be written at the same place. Several gratings can thus be superimposed at the same place: what distinguishes them is their respective pitches in the direction of the thickness, whereas they cannot be distinguished by their location in the plane of the layer since they occupy the same layer region.

To read the information, it should therefore be possible to ascertain that there is a grating with a determined pitch in a determined elementary zone. To this end, the invention uses reading lasers at the same frequency as the writing lasers (one tunable laser or several lasers). When the reading laser passes over a diffraction grating that has been written in the layer of material by a writing laser with a determined wavelength then, if the reading beam has the same wavelength as the writing beam, this passage of the reading laser prompts a general diffraction of the beam and, in particular, it prompts a partial rearward diffraction. On the contrary, when the reading laser has a wavelength different from that used for the writing of the grating, it goes through the grating without being diffracted. It is thus possible to ascertain that this diffraction exists or does not exist, hence to ascertain the presence or absence of a grating with a determined pitch. The selectivity is high: it is all the higher as the number of spatial periods of the diffraction grating is great.

The disk according to the invention, storing the information in optic form, therefore includes a layer of material with photo-induced variation in refraction index, and several diffraction gratings mixed together in the thickness of the layer in each elementary information storage zone.

The reading method according to the invention is generally implies that:

a reading laser is selected, said selected reading laser having a determined frequency among several possible frequencies, and that in each elementary zone of a surface layer of the disk, there is a detection made of the presence of a physical pattern that is diffractive for this frequency and non-diffractive for the other frequencies. The diffracting patterns are constituted by periodic spatial variations of the optic index, within each elementary zone, in the direction of the thickness of the layer, i.e. essentially perpendicularly to the surface.

The method may consist:

either in the choosing of a reading laser with a well-determined wavelength and in the reading of the successive, adjacent regions solely in order to detect therein the ratings having a pitch corresponding to the laser chosen, and then in the changing, if necessary, of the reading wavelength, or in the reading of each zone with several successive reading wavelengths before passing on to the next zone.

If necessary, in particular instances, it is possible to envisage structures wherein the disk has two or more layers of material with photo-induced index variation that would be sensitive, in writing mode, to very different ranges of wavelengths and would each be transparent to each of the wavelengths of sensitivity of the other layers. There would then be superimposed gratings present in each layer. It would thus be possible to further increase the density of information superimposed in one and the same surface region of the disk. It is possible, for example, to devise a method of superimposing an image information element and a sound information element on one and the same optic disk, the sound information element being set up in a lower layer that can be read with a laser having a greater wavelength, hence a lower resolution, than that of the image information element. These two information elements can then be read simultaneously or almost simultaneously. Several reading "tracks" are superimposed for each layer. These reading "tracks" are distinguished from one another not by their physical position but by the laser wavelengths that enable them to be read.

BRIEF DESCRIPTION OF THE DRAWINGS

Other features and advantages of the invention shall appear from the following detailed description, made with reference to the appended figures, wherein.

DETAILED DESCRIPTION OF THE INVENTION

Figure 1:
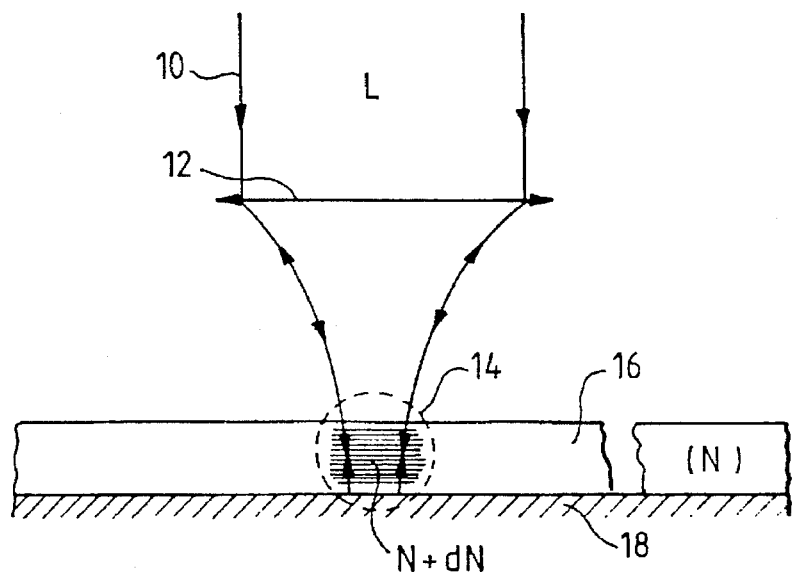
FIG. 1 shows the general principle of optic recording according to the invention.

FIG. 1 shows the general principle of the invention: a laser beam 10 with a wavelength L is focused by lenses 12 on a very small surface zone 14 of a layer of a material having a refraction index N that can be locally modified by the photon energy locally dissipated in the layer.

For reasons of convenience of depiction, the drawing is not done to real scale. For example, the thickness of the layer may be some tens of micrometers at least, or even 100 to 200 micrometers. The surface area of the zone 14, i.e. that of the focusing spot of the laser beam, may be of the order of one square micrometer; and the wavelength L may be of the order of one micrometer or less (visible wavelength). The distance between the focusing means 12 and the surface area of the layer is some millimeters.

The laser beam therefore goes through the layer along a sort of cylindrical tube having a height that is the thickness of the layer and a section, of the order of one square micrometer, that represents an elementary surface zone of the disk wherein several binary information elements are to be recorded.

The layer is preferably plane (it is deposited on a plane supporting disk) so that the surface can easily be scanned by being made to rotate under the laser beam.

The following procedure is used for the writing of information elements on the disk: the layer is formed on a reflecting surface 18 (reflecting for the wavelength L of the laser). For instance, the layer can be initially deposited on a transparent disk, and thereafter this disk is flipped overto plae the layer in contact with the reflecting surface of a support which is not a part of the disk. This allows easier separation between the disk and the reflecting surface when such separation is necessary or desired. However it could be foreseen that the layer is directly formed on a reflecting substrate, and therafter separated from this substrate and set on a different substrate if desired, by any convenient known means.

The laser beam goes through the layer and gets combined with its own reflection in the mirror 18. This results in interferences having the same order of magnitude as the wavelength within the very thickness of the layer. These interferences correspond to maxima and minima of light energy, as is well known in the wave theory of light.

The layer 16 reacts with the energy provided by the laser beam in locally modifying its refraction index all the more so as the energy provided is higher. The refractive index is therefore modified in a pattern corresponding to that of the interference grating. There are maxima and minima of index variations according to the same pattern as the maxima and minima of the interference grating. These index variations are permanent. They are symbolized in FIG. 1 by a system of lines with modified index N+dN but, in practice, the grating is more complex than a simple system of juxtaposed lines.

The recording is a sort of hologram in the thickness of the layer 16.

The appropriate materials for the layer 16 are precisely materials for holograms. Appropriate photopolymers are described by Booth in *Applied Optics*, Vol. 14, p. 593, 1975, or by Monroe, Smothers, Krebs, Mickish in *SPIE Symposium On Hybrid Imaging Systems*, Rochester, N.Y. 1988. Materials such as lithium niobate, $LiNbO_3$, bismuth germanate, $Bi_{12}GeO_{20}$ or bismuth silicate $Bi_{12}SiO_{20}$ may also be suitable.

The magnitude of the index variation is not high. Its maximum value is, for example, one per cent (1%), but this is far more that what is needed for the reading operation, as shall be seen further below, provided that the thickness of the layer is enough to permit the housing therein of a large number of spatial periods of the interference grating.

Actually, a far lower value of laser beam energy is applied than that needed to produce this 1% variation in index: rather, a total energy is applied such that the maximum values of the gratings of interferences prompt local variations in index of the order of 0.02%.

In this way, the layer is not saturated with a single recording of an interference grating. On the contrary, a wide margin remains for the recording, at the same position, of other gratings by means of lasers with different wavelengths. With maximum index variations of 0.02% for each grating, tens of different gratings, or even about a hundred of them, can be recorded in one and the same elementary region 14 without saturating the layer.

In short, if the maximum possible variation of the index is X% of the initial index, and if K gratings are to be superimposed at one and the same place, then each of the gratings should individually correspond roughly to an index variation of X/K%.

The information writing operation shown in FIG. 1 is therefore repeated with different laser wavelengths at each point of the surface of the layer 16. Further below, we shall see how the wavelengths are chosen: the problem is one of discrimination during the reading operation.

By way of indication, the energy used for recording in a photopolymer may be 100 millijoules per $cm^2$ to obtain a 0.02% variation in index. This energy corresponds to one nanojoule for one square micrometer. The recording period for a dot may be 100 nanoseconds: the laser power needed for the recording is then 100 milliwatts and, taking account of the overall efficiency of the optic system, this power may be produced by a 50-milliwatt or 100-milliwatt laser.

For the reading it is preferable (but not absolutely indispensable) that the layer 16 should lie no longer on a reflecting surface 18 but rather on a transparent or absorbent surface. Anyway, reading will not necessarily be made on recorded layer 16 itself: reading can be mae on a disk obtained from the recorded layer by holographic duplication; the replica will not have any reflecting layer.

The reading of a piece of binary information recorded at a given position consists in the focusing, at this position, of a laser beam having the same wavelength as that used for record the information, but with lower energy. Either a recording has been made and a holographic type interference grating is recorded in the form of a pattern of variations in the optic index of the material, or else no recording has been made and there is no grating, or at least there is no grating corresponding to the same recording wavelength for there may be gratings corresponding to other wavelengths.

If there is a pattern, the laser beam is highly diffracted for the pitch of the pattern is that of the interferences created by the same wavelength. A part of the diffracted light is sent backwards (backscattered) and may be detected by a photodetector.

If there is no pattern (corresponding to this wavelength), the laser beam goes through the layer without diffraction and no light is backscattered. This is true even if there are patterns that have been recorded at the same point and correspond to other wavelengths: the laser beam goes through these patterns without diffraction and no light is backscattered.

Figure 2:
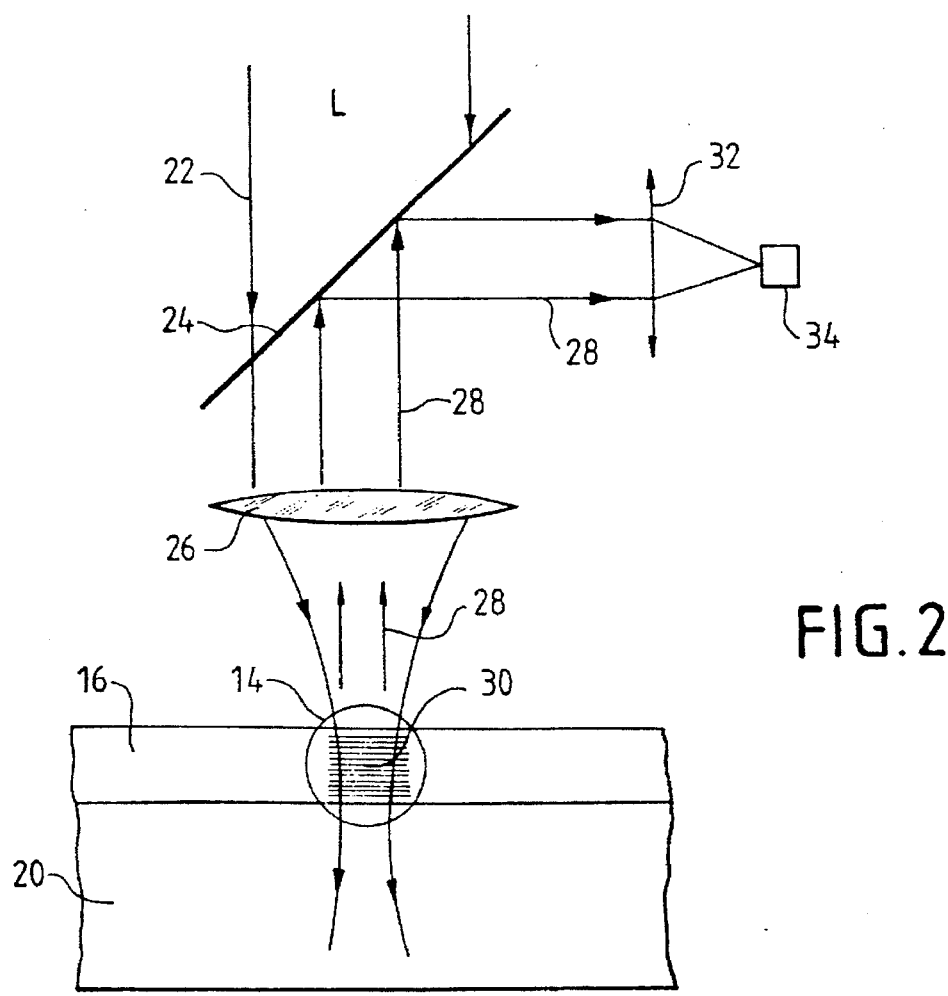
FIG. 2 is a schematic drawing showing the process of reading the recorded information.

FIG. 2 shows the principle of this laser reading operation. Naturally, the energy of the reading laser beam is far smaller than that of the writing beam so as not to induce any variation in index in the material during the reading operation.

The layer 16 is on a preferably transparent support 20 (the substrate of a disk). The reading laser beam 22 transmitted through a semi-reflecting slanting mirror 24 is focused by an optic lens 26 on a small zone 14 of the surface of the layer 16 and throughout the thickness of the layer beneath this surface. Light 28 is possibly backscattered by the presence of a diffraction grating 30 in the layer 16 if the grating has been recorded at the same wavelength as that of the reading laser 22. This light is sent back through the optic lens 26 to the mirror 24. The mirror 24 sends it on to an optic system 32 which focuses it on a photodetector 34. The photodetector gives the desired binary information on the presence or absence, at a given place, of a diffraction grating corresponding to the wavelength of the reading laser.

The laser is tunable so that the disk can be read with different wavelengths corresponding to the different writing wavelengths. Or else, several different lasers are provided for, and are used in turn.

The movement of the laser in relation to the surface of the disk, in reading as well as in writing modes, is of a standard type for optic recording media: the most efficient approach lies in using a plane disk to support the layer 16 and in making the disk rotate in relation to a fixed laser beam oriented perpendicularly to the surface of the disk. The position of the beam in relation to the disk is, for example, servo-linked in a standard way to a track etched in the disk.

Figure 3:
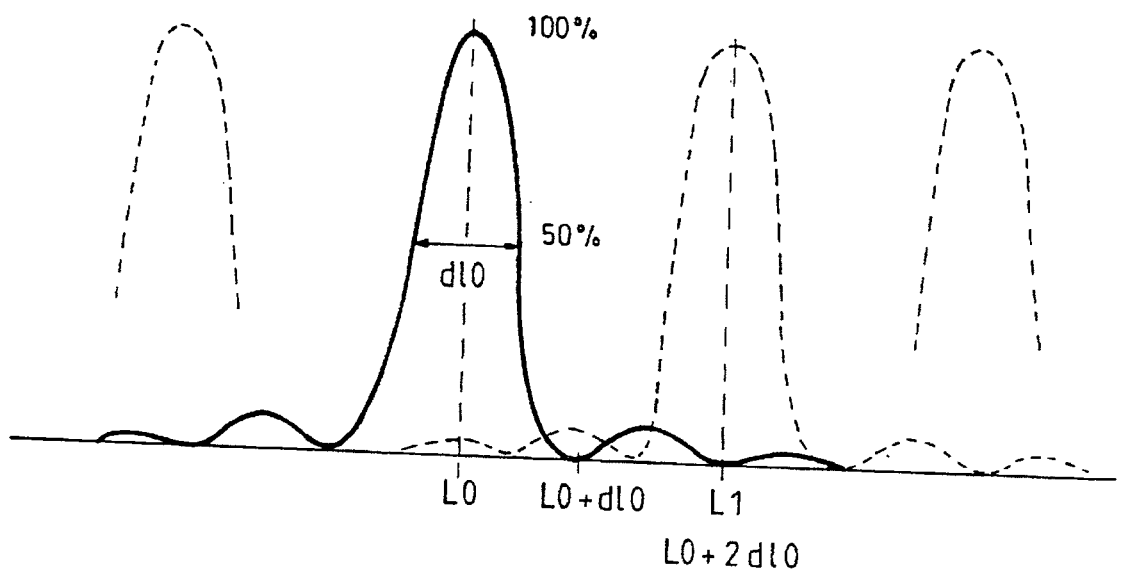
FIG. 3 shows the general shape of the curves of selectivity of the diffraction.

FIG. 3 shows the efficiency of diffraction of a laser beam by a diffraction grating created in the layer 16 by photoinduced index variation. This efficiency is the ratio between the intensity of the light diffracted backwards and that of the incident beam. Even if this efficiency is low (a small proportion of the incident beam returns backwards and can be collected at the photodetector), it is highly selective as a function of the wavelength, and there is a highly accentuated peak for the wavelength corresponding precisely to the wavelength of the diffraction grating writing laser.

As can be seen in FIG. 3, the efficiency of diffraction as a function of the wavelength is a curve of the type $(sinx/x)^2$, i.e. it has a very clear maximum at the wavelength L and, on either side of this maximum, it exhibits an alternation of secondary minima and maxima that have far smaller amplitudes than the main peak.

The spectral selectivity may be expressed by the ratio dl0/L0 between the with dl0 of the main peak at mid-height (corresponding to a 50% drop in efficiency) and the wavelength L0 at the center of the main peak.

The efficiency exhibits minima between the peaks of the curve and the difference in wavelength between a maximum and a minimum is precisely of the order of dl0 for a $(\sin x/x)^2$ curve.

To enable discrimination among several gratings diffracting at different wavelengths, the wavelengths corresponding to the different gratings have to be shifted by a distance sufficient for the curves of efficiency corresponding to these different wavelengths not to get mixed up with one another.

This is what is shown in FIG. 3: it is preferable to center the second wavelength L1 at a distance 2dl0 from the first wavelength L0, then the third wavelength L2 at a distance 2dl1 from the central peak of the second wavelength, etc.

If the spectral selectivity is sufficient (if dl0/L0 is sufficiently low) it is possible to discriminate among a large number of gratings close to one another, i.e. in a range of wavelengths ±10% or ±20% around a central wavelength. Beyond this range, it must be borne in mind that the gratings could diffract harmonic frequencies of the laser frequencies that were used for the writing operation and that there is therefore a risk of erroneous interpretation of a reading operation.

For example, it is possible to consider the use of several tens of different wavelengths in a range of visible wavelengths ranging from 0.73 micrometer to 0.87 micrometer, the wavelengths being separated from one another by distances of the order of 0.005 micrometer. However, this possibility can be envisaged on condition that the selectivity is sufficient, i.e. that the distance dl0 of the curve of FIG. 3 is smaller than 0.002 or 0.003 micrometer. We then have a recording system with superimposed gratings having pitches distributed, for example, between a value P−p1 and a value P+p2, p1 and p2 being of the order of 10% to 20% at the maximum.

To obtain the desired selectivity, the diffraction gratings should be constituted on a large number of spatial periods. This is why the gratings are recorded in a substantial thickness of layer, for example of the order of 100 or 150 micrometers: for visible light at 0.8 micrometer and for a refraction index of about 1.5, the pitch of the gratings is about 0.3 micrometer. It is therefore possible to record 300 to 500 grating pitches in a thickness of 100 to 150 micrometers. This number enables very high efficiency and diffraction selectivity to be obtained.

Besides, it can be computed that the spectral selectivity dl0/L0 is equal to the inverse of the number of spatial periods of the diffraction grating and, consequently, for a number of spatial periods equal to 500 and for a wavelength L0 of about 0.8 micrometer, the recording wavelengths must effectively be separated by intervals of at least 2dl0, i.e. at least 0.003 micrometer.

The efficiency of diffraction at the maximum of the selective curve can also be computed. It is the ratio between the intensity of the diffracted wave and the intensity of the incident beam. It is proportional to the square of the number of spatial periods of the grating (whence the importance of the having sufficient thickness) and to the square of the variation in index dN forming the diffraction grating. It can be estimated as being in the range of 1% or a few per cent with the orders of magnitude given further above, and this is enough to enable a detection of the presence of a diffraction grating.

With regard to the practical aspect of the reading of the optic disk, it must be noted that the procedure will use a standard movement of a reading head over tracks containing the successive elementary zones containing the recorded data. The reading head will include the laser beam and the wide-aperture focusing objective that concentrates the beam on a very small elementary zone (one square micrometer). The servo-link with a determined track will be done, for example, by the etching of guiding grooves in the surface of the disk, exactly as is done in disks presently marketed for large-scale consumer products. The grooves may be located on the substrate of the disk, beneath the transparent layer with photo-induced index variation.

With respect to the reading laser, the making of tunable lasers is known: the frequency tuning can be done notably by variation of the temperature of the emission cavity, and finer tuning can be done by variation of the injection current for the laser diodes.

What is claimed is:

1. An optical storage device having digital information stored therein, comprising:

a single layer of transparent material containing diffraction optical gratings wherein said layer has a plurality of elementary zones having a thickness and wherein, in each of said plurality of elementary zones, several different mixed diffraction gratings are formed within the thickness of said layer, each grating in a determined one of said elementary zones corresponding to a respective bit of digital information stored in said zone, said bit being defined by the presence or absence in said determined one of said elementary zones, of a grating which diffracts at a determined wavelength, each grating having a structure being capable of selectively diffracting an electromagnetic radiation applied perpendicular to said layer an of only a single determined wavelength among several different wavelengths each diffractable by a respective diffraction grating and outputting a diffracted beam perpendicular to said layer.

2. A device according to claim 1 wherein the layer is a layer of material with photo-induced variation in refraction index in which the mixed diffraction gratings are recorded by local modification of refraction index according to a pattern that is diffractive in fringes parallel to the surface.

3. A device according to claim 2, wherein the layer is constituted by a photopolymer capable of storing holographic type recordings.

4. A device according to any one of claims 1, 2 or 3, wherein the patterns of the different diffraction gratings have pitches distributed between a value P−p1 and P+p2, where P is a pitch value and p1 and p2 are of the order of 10% to 20% of P.

5. A device according to one of claims 1, 2 or 3, wherein the wavelength diffracted by a first grating differs from the wavelength closest to the first one, diffracted by another grating, by a value substantially equal to 2d1, where d1 is a distance between the first wavelength or which the diffraction by the first grating is the maximum and a neighboring wavelength for which the diffraction by the same grating is the minimum.

6. A device according to one of claims 2 or 3, wherein the photo-induced variation in index corresponds, for each grating, to a local variation in index that is smaller than a few percent of the maximum variation in index.

7. A device according to one of claims 1, 2 or 3 wherein the thickness of the layer is equal to at least a tenth of a micrometer.

8. A device according to one of claims 1, 2 or 3 wherein the layer is formed on a plane disk.

9. A device according to one of claims 1, 2 or 3 wherein the layer is formed on a reflecting substrate.

10. A device according to one of claims 1, 2 or 3 wherein the layer is formed on a light absorbing substrate.

11. A method for reading optical information, comprising:

using an optical storage medium having a transparent surface layer and having information stored within the thickness of the layer, said information comprising diffractive physical gratings recorded in elementary zones of the layer with at least two different gratings superimposed within the thickness of at least one elementary zone of the layer, each of said different gratings being selectively diffractive for a given respective frequency different from the frequencies selectively diffracted by the other gratings in said at least one elementary zone, selecting at least two determined reading laser frequencies corresponding to the frequencies diffracted by said gratings, focusing a first laser beam perpendicular to said layer and having a first of said selected frequencies on a selected elementary zone, and detecting, by a presence or absence of a diffracted beam perpendicular to said layers, in said elementary zone, a respective presence or absence of a physical grating which is diffractive for said first selected frequency;

focusing a second laser beam perpendicular to said layer and having a second of said selected frequencies on said elementary zone, and detecting, by the presence or absence of a diffracted beam perpendicular to said layer, in said elementary zone, of a respective presence or absence of a physical grating which is diffractive for said second selected frequency.

12. A reading method according to claim 11, wherein said laser beams are directed substantially perpendicular to the surface layer.

13. A reading method according to claims 11 or 12 wherein said laser beams are produced by a tunable laser device.

14. An optical reading device for reading optical information comprising:

an optical storage medium having a single transparent surface layer and having information stored within the thickness of the layer, said information comprising diffractive physical gratings recorded in elementary zones of the layer with at least two different gratings superimposed within the thickness of at least one elementary zone of the layer, each of said different gratings diffractive for a given light frequency different from light frequencies diffracted by the other gratings in said at least one elementary zone, reading laser means for focusing a laser beam at a first frequency on a selected elementary zone of said layer and through the thickness of and perpendicular to said layer, said reading laser means also adapted to focus a laser beam and through the thickness of said layer, detecting means adapted to detect the presence of a diffracted beam at said first frequency and perpendicular to said layer, coming from said elementary zone due to the presence, in said elementary zone, of one of said at least two different physical gratings, and the presence of a diffracted beam at a second frequency and perpendicular to said layer, coming from said elementary zone due to the presence, in said elementary zone of another of said at least two different physical gratings.

15. A reading device according to claim 14, comprising a semireflecting mirror between said reading laser means and a supporting surface for receiving said optical storage medium, said semi-reflecting mirror being transparent for the laser beams issued from the reading laser means and being adapted to reflect a diffracted beam from said optical storage medium towards said detecting means.

16. A reading device according to claim 14 comprising means for focusing said laser beams from said reading laser means substantially perpendicularly to said surface layer.

17. A reading device according tone of claims 14, 15 or 16 wherein said reading laser means comprise a tunable laser device.

18. A reading device according to one of claims 14, 15 or 16 wherein said reading laser means comprise several laser devices each emitting at a respective frequency.

* * * * *